United States Patent

Hall et al.

[11] Patent Number: 5,921,616
[45] Date of Patent: Jul. 13, 1999

[54] ADJUSTABLE DOOR UNIT FOR POP-UP CAMPERS

[75] Inventors: Ron E. Hall, Goshen; Larry W. Jones, Ligonier, both of Ind.

[73] Assignee: Jayco, Inc., Middlebury, Ind.

[21] Appl. No.: 08/847,164

[22] Filed: Apr. 30, 1997

[51] Int. Cl.$^6$ ................................... B60P 3/335
[52] U.S. Cl. .................... 296/168; 296/146.5; 296/173; 296/172; 296/146.9
[58] Field of Search ............... 296/146.5, 173, 296/172, 168, 146.9; 49/501, 504, 505; 52/67, 72, 204.56

[56] References Cited

U.S. PATENT DOCUMENTS

| 1,279,879 | 9/1918 | Klingberg | 296/173 |
| 3,488,082 | 1/1970 | Wallace | 296/173 |
| 4,192,542 | 3/1980 | Hill | 296/173 |

FOREIGN PATENT DOCUMENTS

645716  7/1962  Canada ................................ 296/173

*Primary Examiner*—Joseph D. Pape
*Assistant Examiner*—Kiran Patel
*Attorney, Agent, or Firm*—Baker & Daniels

[57] ABSTRACT

A device for securing the door frame and door of a tent camper in a useable position after the tent camper top has been raised relative to the camper body. A bracket having a downwardly facing elongated channel is attached to the inside of the camper top, and a moveable panel slidably attached to the door frame secures the door frame to the camper top when the camper is raised. The moveable panel includes a top edge having an angled surface that fits within the channel, and the angled surface presses the moveable panel and the door frame aginst the roof mounted bracket. The moveable panel is secured against the bracket by thumsbscrews, and the panel adjusts in order to account for situatiuons in which the top is not entirely parallel to the body.

22 Claims, 8 Drawing Sheets

ADJUSTABLE DOOR UNIT FOR POP-UP CAMPERS

The present invention relates to an adjustable door unit for pop-up campers which adjustably secures the door frame to the camper so that the door will operate smoothly even when the raised camper top is slightly angled relative to the camper body, such as when the camper is parked on uneven terrain.

BACKGROUND AND SUMMARY OF THE INVENTION

Towable tent campers and pop-up trailers having collapsible roofs are generally well known in the art. Despite the wide spread popularity of large recreational vehicles such as motorhomes and fifth wheel trailers, many consumers prefer the relative simplicity, low cost and ease of operation of the smaller and less expensive towable pop-up trailers and tent campers. On a pop-up camper, the top folds down to a collapsed, compact state giving the trailer a low aerodynamic profile and making the trailer easily towable by small cars and light trucks. Once the desired destination has been reached, the collapsible top is raised relative to the body to form a temporary living space which is typically enclosed by flexible, tent like walls.

On early tent campers the body portion included a short door, while entry through the canvas walls was provided by a zipper similar to those found on a standard tent. However, most of today's consumers prefer the more substantial look and feel of a more standard, rigid door, such as is typically found on travel trailers and other larger recreational vehicles. Accordingly, manufactures of pop-up campers typically provide a door frame assembly that is installed after the camper top has been raised. However, in the event the camper is parked on uneven terrain, or in the event the owner has not raised the top of the camper properly, the door unit is likely to bind making entry and exit from the camper difficult. Accordingly, there exists a need for an adjustable door unit that operates smoothly under all conditions.

The improved door unit of the present invention is easy to operate and ensures that the door unit will operate smoothly under all conditions. A movable panel is used to secure the door frame to the roof of the tent camper so that the door frame remains square regardless of the height, location or angular position of the camper roof relative to the camper body. The movable panel engages a portion of the door frame and also engages a bracket on the camper roof. Convenient thumb screws are provided to secure the moveable panel in place, thus holding the door frame assembly in a usable position.

Accordingly, it is an object of this invention to provide an improved adjustable door frame assembly for pop-up campers.

It is another object of this invention to provide an improved adjustable door frame assembly for use on pop-up campers that allows the camper door to operate smoothly regardless of the terrain or the angle and/or position of the movable top.

Other objects of the invention will become readily apparent to those skilled in the art upon a reading of the following description.

DETAILED DESCRIPTION OF THE INVENTION

The embodiment herein described is not intended to be exhaustive or to limit the invention to the precise form disclosed. It has been chosen and described in order to explain the principles of the invention and its application and practical use to enable others skilled in the art to follow its teachings.

Figure 1:
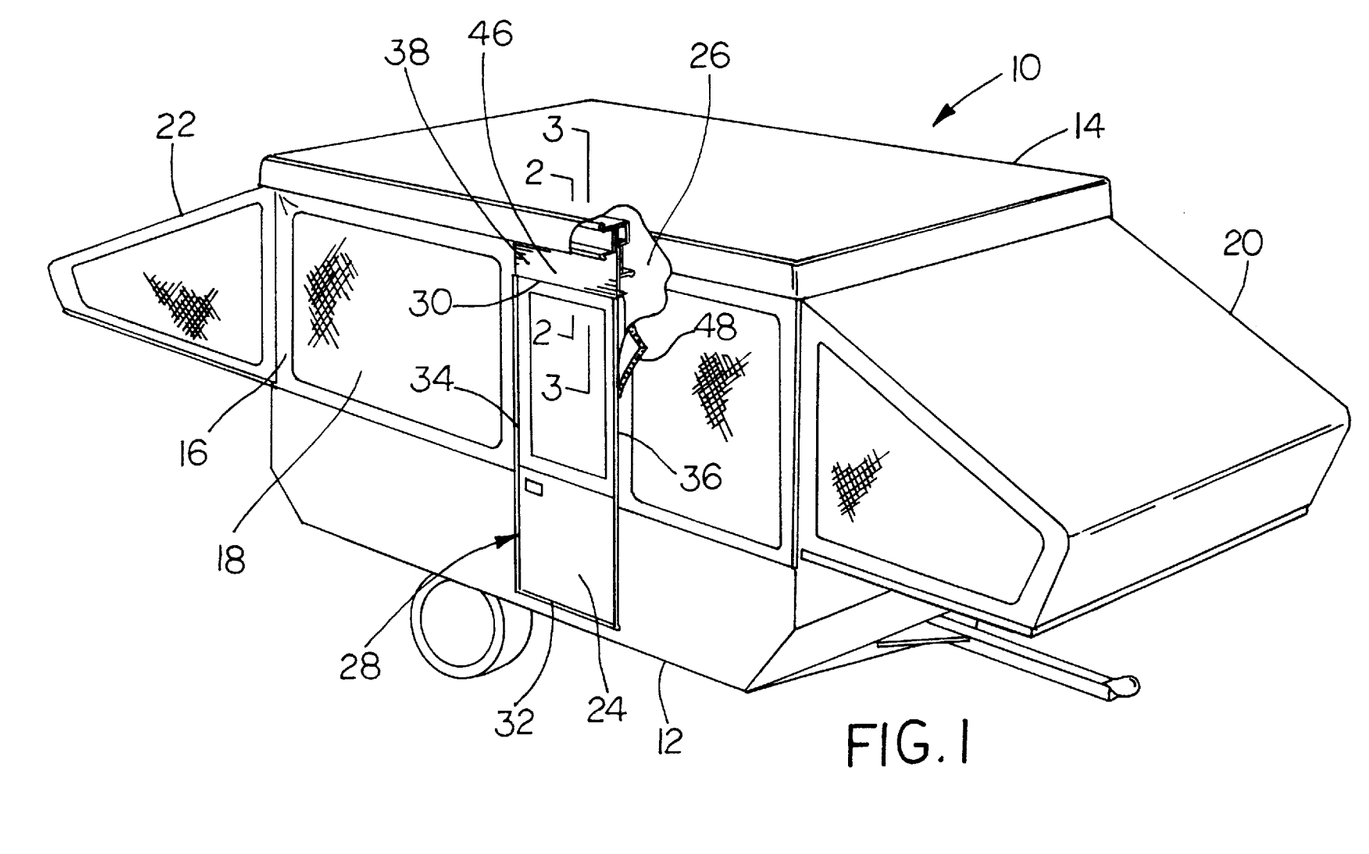
FIG. 1 is a perspective view of a towable pop-up camper with a portion of the movable top and a portion of the flexible side wall cut away to reveal the adjustable door frame assembly.
Figure 2:
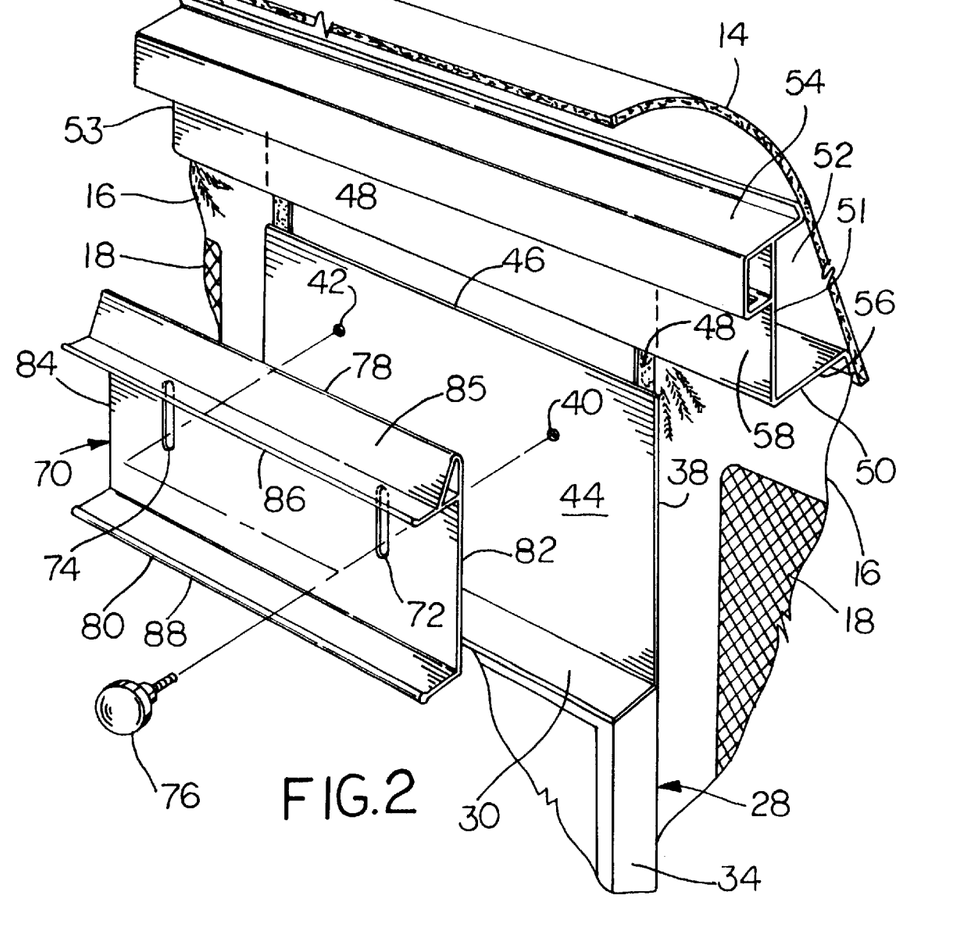
FIG. 2 is an enlarged fragmentary view in perspective taken substantially along lines 2—2 of FIG. 1 showing the adjustable door frame assembly according to the present invention.

Referring now to the drawings, a pop-up tent camper having the adjustable door assembly of the present invention is generally referred to by the reference numeral 10. Camper 10 includes a lower or body portion 12 and top portion 14 that is raisable relative to the body portion using conventional telescoping support posts or similar means (not shown) as are commonly employed in the industry. Camper 10 includes flexible side walls 16 and a number of flexible windows 18, and also includes a front and rear foldout section 20, 22 which expand the interior 26 of camper 10. A door 24 provides entry to the enclosed interior 26. Door 24 is mounted to a door frame 28 by hinges or similar conventional means (not shown). Frame 28 includes top and bottom edges 30, 32, and a pair of side edges 34, 36. As shown in FIG. 2, a rigid panel 38 extends upwardly from top edge 30 of door frame 28, and includes a pair of apertures or holes 40, 42. Panel 38 includes an inner face 44 which faces the interior 26 of camper 10 and an outer face 46 which faces outwardly away from the camper 10. Door frame 28 also includes a pair of Velcro hook and loop fastening strips 48 or similar hook and loop fasteners which help to secure the edges of the frame 28 to the flexible side walls 16 in order to prevent wind and/or water from entering the camper 10 around door frame 28.

Figure 3:
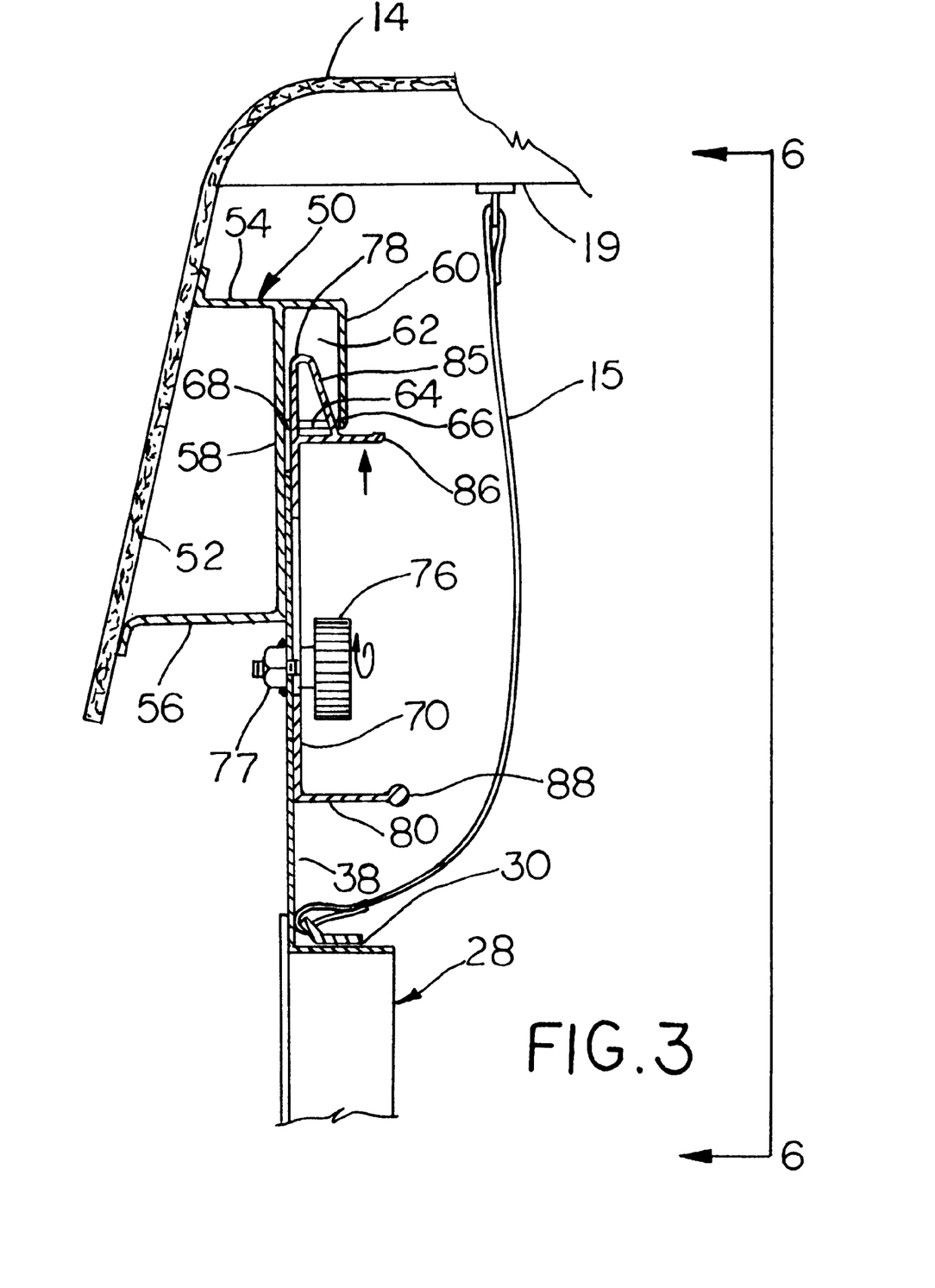
FIG. 3 is a fragmentary view in section of the adjustable door frame assembly shown in FIGS. 1 and 2 taken substantially along lines 3—3 of FIG. 1 showing the movable panel in its extended position and in engagement with the tent camper roof, and also showing an optional stowage strap.
Figure 4:
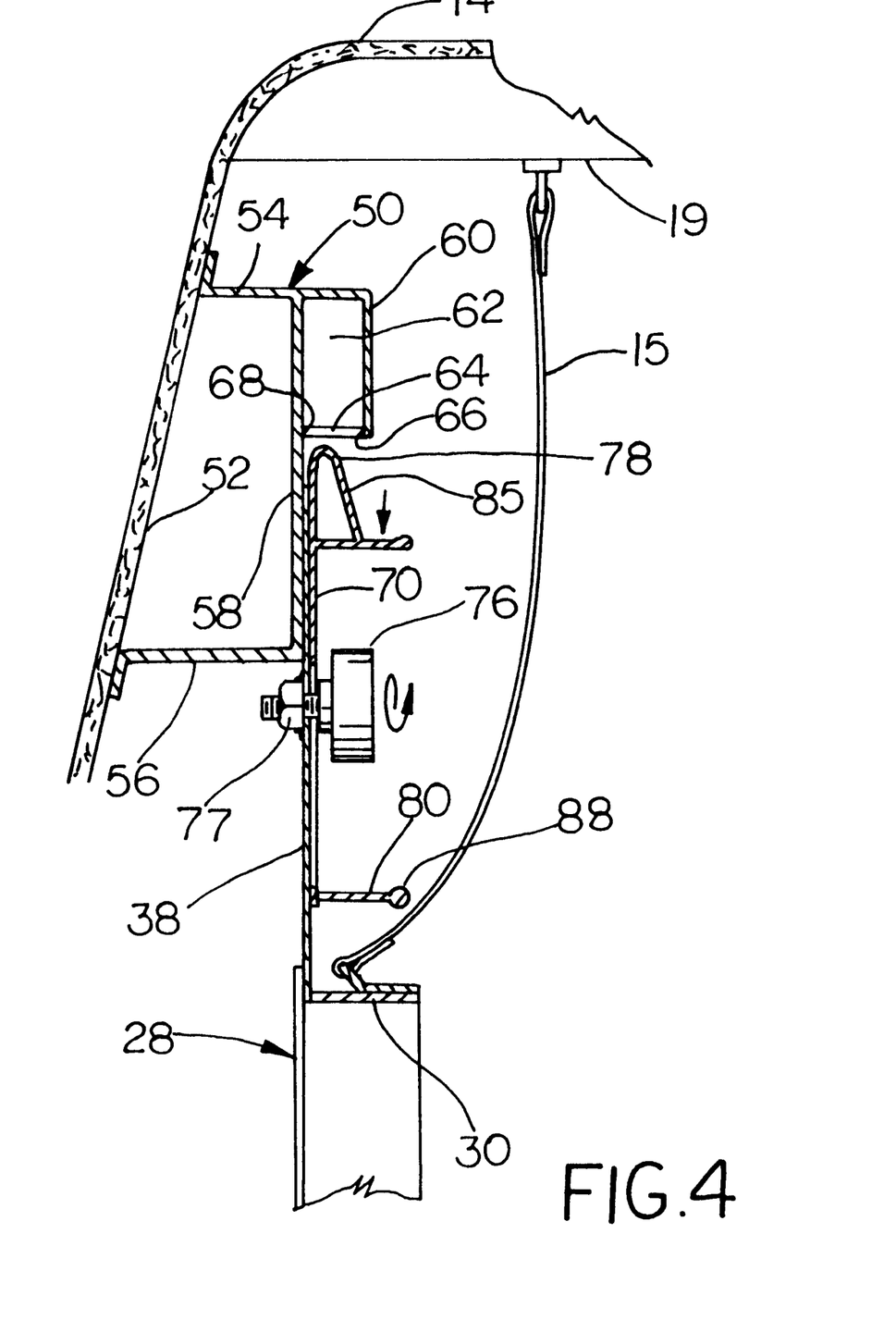
FIG. 4 is a fragmentary view in section similar to that shown in FIG. 3 but showing the movable panel in the retracted position.

As shown in FIGS. 2, 3 and 4, a roof bracket 50 is mounted to the inner face 52 of top 14 by glue, adhesive, or mechanical fasteners (not shown). Bracket 50 includes a pair of ends 51, 53, a top edge 54, a bottom edge 56 and an interconnecting web 58. Bracket 50 also includes a protruding portion 60 which extends toward the interior 26 of camper 10, and which defines a hollow cavity 62 having a downwardly facing channel 64. Channel 64 includes an inner edge 66 and an outer edge 68.

Figure 5:
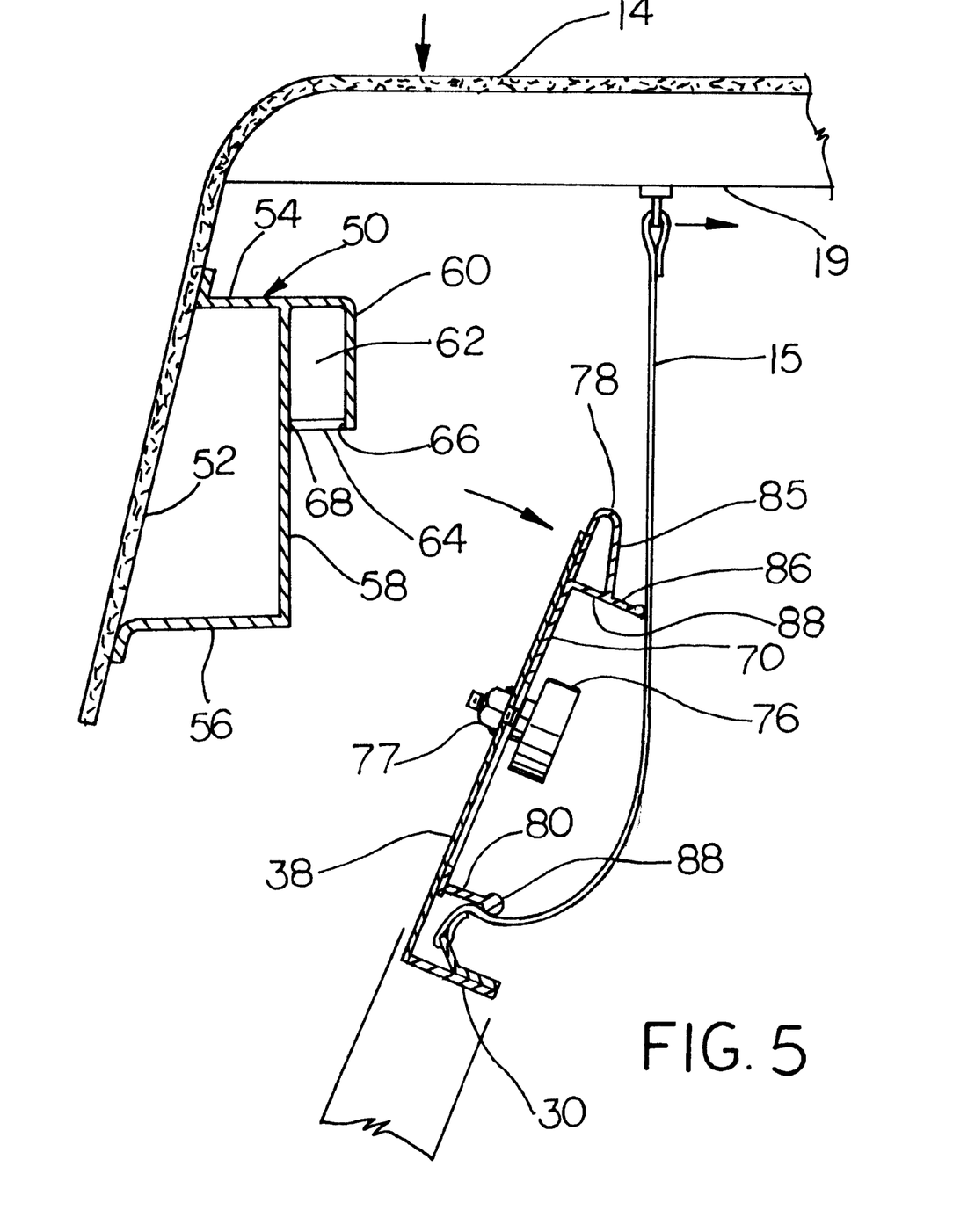
FIG. 5 is a fragmentary view in section similar to that shown in FIGS. 3 and 4 but showing the door frame assembly being moved away from the usable position in preparation for storage.
Figure 6:
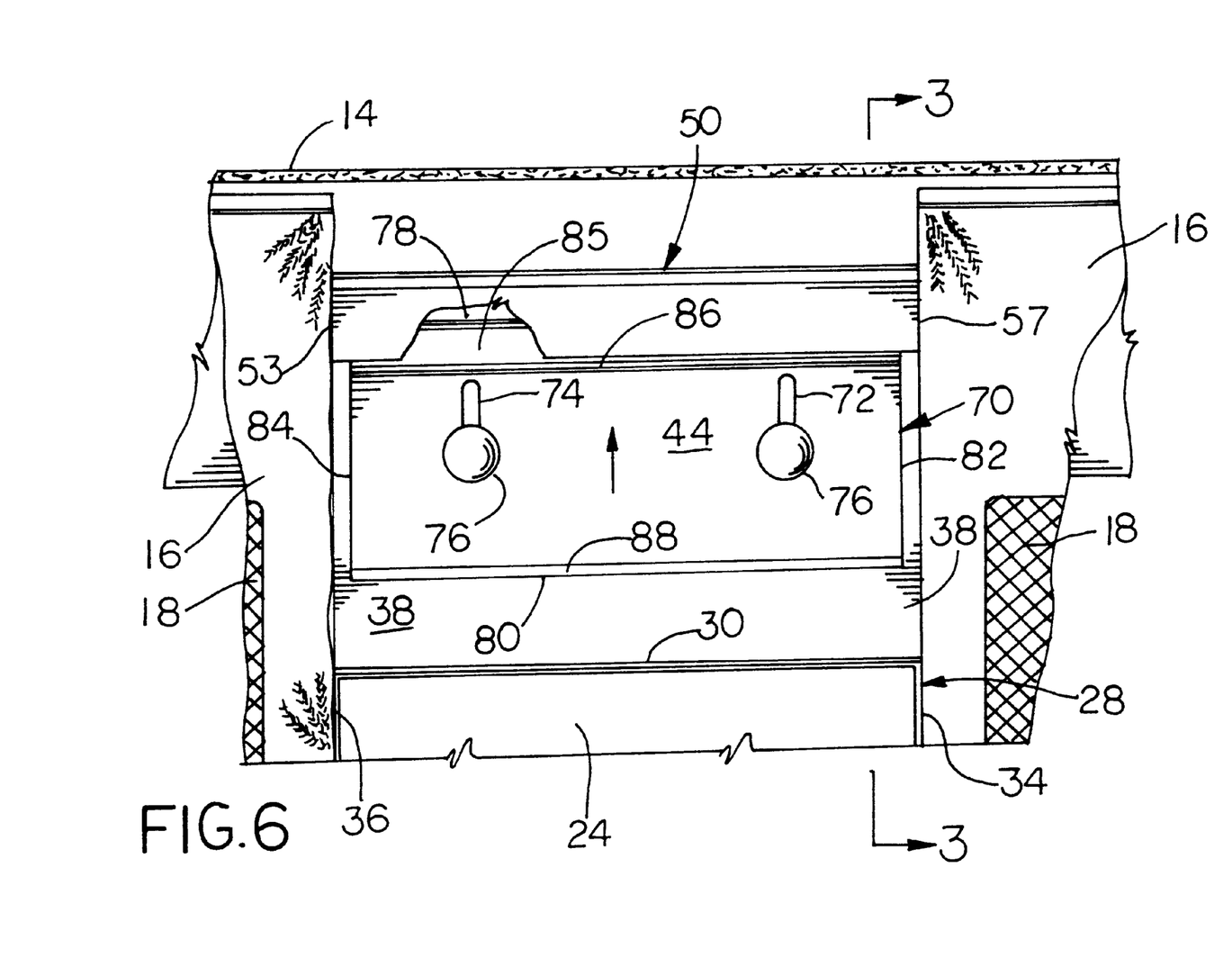
FIG. 6 is a fragmentary elevational view of the adjustable door frame assembly taken substantially along lines 6—6 of FIG. 3 and showing the movable panel in its extended position in engagement with the roof mounted bracket.
Figure 8:
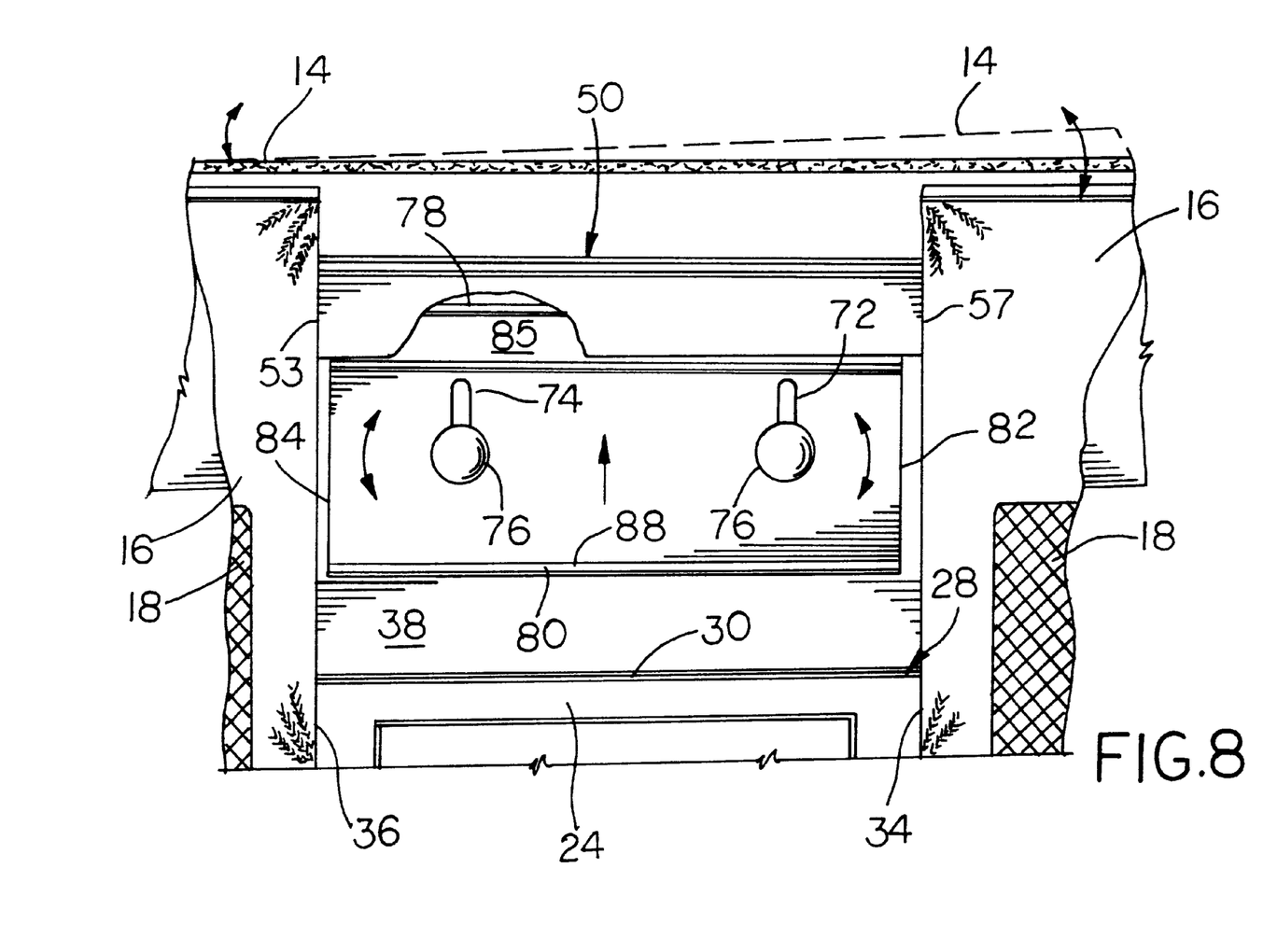
FIG. 8 is a fragmentary elevational view similar to that shown in FIGS. 6 and 7 showing the movable panel in engagement with the roof mounted bracket; the broken lines indicate various angular positions for the roof portion in the event the roof portion has been raised unevenly or if the camper unit has been parked on uneven terrain.

As shown in FIGS. 2 and 3, a movable panel 70 having a pair of vertical slots 72, 74 is adjustably secured to panel 38 by thumb screws 76 which engage threaded nuts 77 attached to the outer surface 46 of panel 38. Alternatively, apertures 40, 42 may be threaded. Movable panel 70 includes an upper edge 78, a lower edge 80 and a pair of side edges 82, 84. As shown in FIGS. 2 and 3, top edge 78 of movable panel 70 includes an angled surface 85 and an inwardly protruding flange or lip 86, while bottom edge 80 includes an inwardly facing flange or lip 88. As can be seen in FIGS. 3, 6 and 8, top edge 78 is sized to be received within channel 64 of bracket 50 which comprise latching means for releasably securing top edge 78 of panel 70 within channel 64 of bracket 50. As shown in FIG. 3, when top edge 78 of movable panel 70 is pushed upwardly through channel 64 and into cavity 62, angled surface 85 contacts inner edge 66 of channel 64, which urges movable panel 70 towards web 58 of bracket 50. When movable panel 70 is in such an extended position, movable panel 70 also forces panel 38 against web 58 of bracket 50. A pair of thumb screws 76 are provided to secure moveable panel 70 in the extended position shown in FIG. 3, or in the retracted position of FIGS. 4 or 5. Thumb screws 76 comprise securement means for securing moveable panel 70 to panel 38 thereby urging moveable panel 70 towards web 58 of bracket 50.

Figure 7:
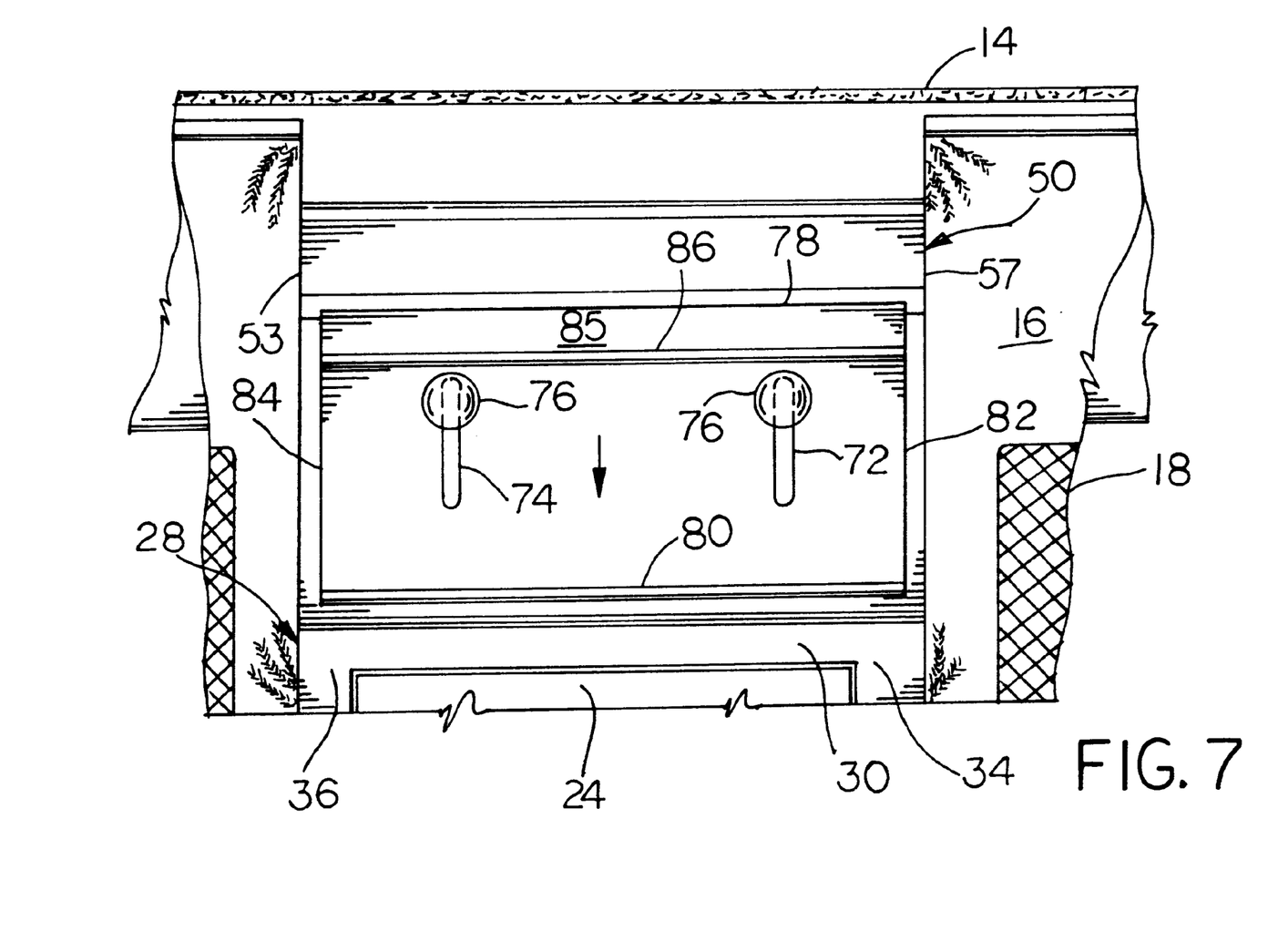
FIG. 7 is a fragmentary elevational view similar to that shown in FIG. 6 but showing the movable panel in the retracted position.

In operation, the camper 10 is usually towed to a camp site by a towing vehicle (not shown). When the camper 10 is in the folded state with the top 14 positioned adjacent the body 12, the door frame 28 and the door 24 are typically stowed in a travel position parallel to the top 14. A flexible strap 15 connects the top edge 30 of door frame 28 to a track 19 on the underside of top 14 as shown in FIGS. 3 and 5, which enables the camper owner to conveniently move the door frame 28 to the stowed position by sliding the strap 15 along the track 19. When a camp site is reached, top 14 is raised relative to body 12 using the telescoping support posts referred to above (not shown). With the top 14 in the raised position, the flexible side walls 16 and windows 18 unfold as shown in FIG. 1 to enclose the interior 26. The front and rear fold out sections 20, 22 are also unfolded which expands the available space of interior 26. Once the top 14 is raised, the bottom edge 32 of door frame 28 is connected to body 12, and the top edge 30 of door frame 28 is manipulated into the position shown in FIG. 5. With the door frame 28 in a usable position, the movable panel 70 is shifted upwardly from the retracted position shown in FIGS. 5 and 7 to the extended position shown in FIGS. 3, 6 and 8. In the process, top edge 78 of moveable panel 70 enters channel 64 of bracket 50. As the moveable panel 70 is raised, angled surface 85 contacts inner edge 66 of channel 64, which urges both moveable panel 70 and fixed panel 38 against the web 58 of bracket 50. Thumbscrews 76 are tightened, which thus secures door frame 28 firmly in place.

Ideally the camper 10 is parked on flat terrain and the top 14 when in the raised position is essentially parallel to the body 12 as shown in solid lines in FIG. 8. However, in the event the camper 10 is parked on uneven terrain, the top 14 may be slightly angled relative to the body 12 as shown in broken lines in FIG. 8. To compensate, the slots 72, 74 in moveable panel 70 are sized to allow moveable panel 70 to tilt slightly, which permits the door frame 28 to be secured in a useable position despite angular irregularities between the top 14 and the body 12.

It should be understood that the above description does not limit the invention to the form disclosed, but may be modified within the scope of the following claims.

What is claimed:

1. On a tent camper having a body portion and a top portion overlying the body portion, the top portion being raisable relative to the body portion, and flexible sidewalls interconnecting the top portion and the bottom portion to create an enclosed living space, a device for adjustably securing a door to the camper when the top portion is in a raised position, said device comprising:

a bracket attached to the top portion;

a door frame, said door frame having a top edge, a bottom edge, and interconnecting side edges, said door frame including an upwardly extending fixed panel attached to said door frame top edge;

a moveable panel slidably mounted to said fixed panel, said moveable panel being shiftable between a retracted position in which said door frame is free to move relative to the camper and an engaged position in which said moveable panel engages said bracket thereby holding said door frame in a usable position;

said bracket and one of said panels including latching means for releasably securing said one panel to the bracket whereby said door frame is maintained in said useable position; and securement means for securing said moveable panel in said engaged position.

2. The device as claimed in claim 1, wherein said latching means includes an elongated internal cavity in said bracket, said cavity including a channel for receiving said moveable panel when said moveable panel is in said engaged position.

3. The device as claimed in claim 2, wherein said channel faces downwardly.

4. The device as claimed in claim 2, wherein said moveable panel includes a top edge being sized to fit into said channel.

5. The device as claimed in claim 4, wherein said moveable panel top edge includes an angled surface.

6. The device as claimed in claim 1, wherein said fixed panel includes a pair of spaced apart threaded apertures, said moveable panel includes a pair of spaced apart slots, each of said slots being in alignment with one of said threaded apertures, and said securement means includes a thumbscrew inserted through each of said slots and into engagement with one of said threaded apertures.

7. The device as claimed in claim 3, wherein said channel includes an inwardly facing outer edge and said angled surface contacts a portion of one of said outer edge when said moveable panel is in said engaged position, thereby forcing said moveable panel and said fixed panel against said bracket.

8. The device as claimed in claim 1, wherein said door frame bottom edge is adjacent to said body portion when said top portion is raised relative to said body portion.

9. The device as claimed in claim 8, wherein said door frame includes hook and loop fasteners to secure said door frame side edges to the flexible sidewalls.

10. The device as claimed in claim 1, said securement means further for rigidly securing said door frame to the top portion and the body portion.

11. The device as claimed in claim 1, said securement means further including adjustment means for adjusting the angular position of said moveable panel relative to said door frame and said bracket.

12. On a tent camper having a body portion and a top portion overlying the body portion, the top portion being raisable relative to the body portion, and flexible sidewalls interconnecting the top portion and the bottom portion to create an enclosed living space, a device for adjustably securing a door to the camper when the top portion is in a raised position, said device comprising:

a bracket attached to the top portion;

a door frame, said door frame having a top edge, a bottom edge, and interconnecting side edges, said door frame including an upwardly extending fixed panel attached to said door frame top edge;

a moveable panel slidably mounted to said fixed panel, said moveable panel being shiftable between a retracted position in which said door frame is free to move relative to the camper and an engaged position in which said moveable panel engages said bracket thereby holding said door frame in a usable position; and securement means for securing said moveable panel in said engaged position.

13. The device as claimed in claim 12, wherein said bracket includes an elongated internal cavity, said cavity including a channel for receiving said moveable panel when said moveable panel is in said engaged position.

14. The device as claimed in claim 13, wherein said channel faces downwardly.

15. The device as claimed in claim 13, wherein said moveable panel includes a top edge being sized to fit into said channel.

16. The device as claimed in claim 15, wherein said moveable panel top edge includes an angled surface.

17. The device as claimed in claim 12, wherein said fixed panel includes a pair of spaced apart threaded apertures, said moveable panel includes a pair of spaced apart slots, each of said slots being in alignment with one of said threaded apertures, and said securement means includes a thumbscrew inserted through each of said slots and into engagement with one of said threaded apertures.

18. The device as claimed in claim 14, wherein said channel includes an inwardly facing outer edge and said angled surface contacts a portion of one of said outer edge when said moveable panel is in said engaged position, thereby forcing said moveable panel and said fixed panel against said bracket.

19. The device as claimed in claim 12, wherein said door frame bottom edge is adjacent to said body portion when said top portion is raised relative to said body portion.

20. The device as claimed in claim 19, wherein said door frame includes hook and loop fasteners to secure said door frame side edges to the flexible sidewalls.

21. The device as claimed in claim 12, said securement means further for rigidly securing said door frame to the top portion and the body portion.

22. The device as claimed in claim 12, said securement means further including adjustment means for adjusting the angular position of said moveable panel relative to said door frame and said bracket.

\* \* \* \* \*